United States Patent Office 3,340,400
Patented Sept. 5, 1967

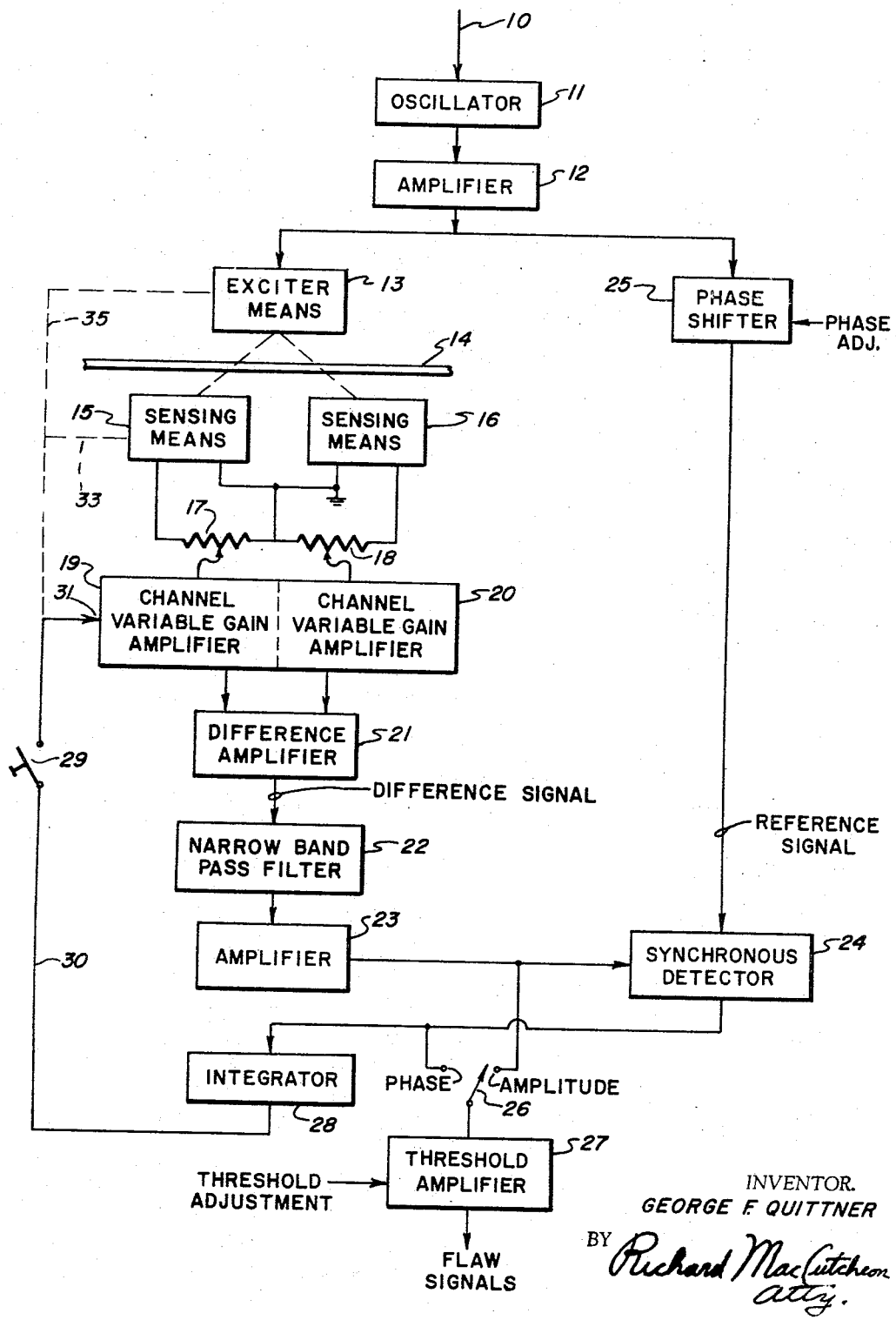

3,340,400
DUAL CHANNEL FLAW DETECTOR HAVING PHASE COMPARISON FEEDBACK FOR AUTOMATIC BALANCING
George F. Quittner, Cleveland Heights, Ohio, assignor, by mesne assignments, to API Instruments Company, Chesterland, Ohio, a corporation of Ohio
Filed June 11, 1964, Ser. No. 374,306
10 Claims. (Cl. 250—219)

ABSTRACT OF THE DISCLOSURE

An oscillator energized exciter provides paths through discrete workpiece sample portions to sensors connected through amplifier means to a difference detector. A comparator compares the phase of the difference detector output with that of a reference derived from the oscillator, and output of the phase comparator is applied as feedback to one of the exciter-sample-sensor-amplifier paths.

---

This invention relates to improvements in non-destructive testing of materials and, more particularly, to an automatic balancing arrangement for flaw detection apparatus.

Priorly, numerous types of non-destructive testing apparatus for detecting flaws in continuous workpieces, samples, or testpieces have been employed. Frequently these apparatus employ a null type of balanceable system in which two flaw detecting channels are produced which system includes alternating current excitation means linked by a separate energy component with each of two sensing means through the workpiece, or sample, to be tested, which sensing means produce a pair of comparable signals which are balanced or compared as to phase or amplitude to indicate flaws in the workpiece. A disadvantage of these balanceable input flaw detection apparatus is the exceedingly critical adjustment of the null, or balance, of the signals through these two channels. The remarkable sensitivity of such systems depends on operation while precisely balanced and, due to that sensitivity, the balanced condition tends to drift due to small temperature and sample changes. Not only does this drift reduce sensitivity to flaws, but the unbalance erroneously appears to the output signal in the device as a protracted flaw.

Frequently, in the non-destructive testing apparatus known in the art, an excitation means in the form of an inspection "head" assembly includes means for utilization of an alternating current source to provide at least two output signals or energy components. The output signals or energy components are delivered to a pair of transducers by cooperation with a workpiece to be tested and these output signals are compared by comparing the difference between their amplitudes or phases. The differences between these signals are indicated as flaw conditions in the workpiece. If the two output signals are phased oppositely, they may be electrically added in order to indicate flaws in the workpiece. If they are phased alike, they may be electrically subtracted, for example, by means of a difference amplifier to yield a difference signal indicative of a flaw. The two output signals may be in the form of beams of light, electrostatic fields, or electromagnetic fields depending upon the particular type of workpiece being tested. A minimum residual, or null, output signal of this comparison in the absence of a flaw is a most important factor in determining the sensitivity of the apparatus.

Even with the best possible null there is always some residual signal at the excitation frequency, that is, the frequency of the signals radiated from the excitation means, if usual amplification is provided. I have discovered that, characteristically, this residual minimum amplitude null signal is at about 90° phase angle either leading or lagging the excitation signal. I have also discovered that when the null is disturbed, as it is not only by flaws but by misadjustment or malfunction anywhere in either of the flaw detecting channels and out-of-pass line movements of the sample relative to the excitation means, the signal not only increases in amplitude but its phase angle tends to move toward zero, or 180°, with respect to the excitation signal.

When the workpiece or material to be inspected moves continuously through the inspection region, i.e., the region of mutual cooperation between the excitation means and the sensing means, the passage of a flaw is signalled by several amplitude and phase excursions of the signal detected by the sensing means over a relatively short period of time. By contrast, the undesirable increase in null voltage or signal resulting from drift or changes in characteristics of the apparatus occurs relatively slowly and results in a null signal average amplitude which is higher than is tolerable for accurate measurements and whose average phase angle lies to one side or other of the 90° angle relative to the excitation signal.

Accordingly, it is an object of this invention to provide a simple and economical apparatus for automatically maintaining a balanced flaw sensing system at null in the absence of a flaw.

Another object of this invention is to provide a relatively slow automatic balancing action in a null indicating flaw detection system, permitting distinction between relatively rapid flaw signals and relatively slow adjustment for drift in sample (workpiece) shape, and relative position of the excitation or sensing means and the workpiece.

A further object of this invention is to provide an automatically nulled flaw detection system with provision for indicating flaws from either phase or amplitude relationships without adding appreciably to the cost or complexity of the apparatus.

Briefly, in accordance with aspects of this invention, I have discovered that a null type flaw detecting apparatus can be automatically balanced by employing a feedback arrangement which corrects for any drift in the difference or resultant signal under conditions when no flaw is being detected. Advantageously, the feedback is derived from a phase comparison of a reference signal derived from source of alternating current, such as an oscillator, used for linking with sample to permit flaw detection with the nulling signal derived from a comparision of two signals each fed from one of a pair of flaw detecting channels. This feedback is employed to re-establish a null in the system and the feedback path preferably includes an integrator circuit which integrates (low pass averages) the drift to provide a feedback signal which slowly returns the system to a balanced condition although the higher values of flaw signals, being of shorter time duration, do not affect the balance.

In accordance with other and more specific aspects of this invention, I provide a flaw detection apparatus of the null type employing two flaw detecting channels with appropriate exciting and sensing means, and two variable gain amplifiers, with a source of reference signals, a phase comparison circuit, an integrator and a feedback circuit. An amplitude signal comparison circuit in the form of a difference amplifier is coupled to the outputs of the variable gain amplifiers for deriving a signal indicative of this comparision. This difference signal is fed through a narrow band pass filter to eliminate harmonic frequencies of the desired frequency and to eliminate other undesirable signals such as noise. The output of this band pass filter is fed through a suitable amplifier to a phase comparison circuit which may also be called a synchronous detector.

The synchronous detector also receives a reference signal from a reference signal source such as a phase shifter coupled between the alternating current source and the synchronous detector. A feedback path is coupled from the synchronous detector output to one of the flaw detecting channels, preferably to one of the variable gain amplifiers to deliver a signal which varies in accordance with the drift of the excitation means and this feedback path preferably includes an integrator, which integrates, or low pass averages, the departure of the null signal from a true null and delivers this feedback to one of the flaw detecting channels such as to one of the variable gain amplifiers to correct this channel for the drift from the null position. Alternatively, the feedback signal may be fed to one exciting means to control one of the energy components, or, this signal may be fed to one of the sensing means to control its sensitivity. Advantageously, flaw signals may be taken from the output of the synchronous detector, which flaw signals will be phase responsive signals and are preferably fed through a threshold amplifier to a suitable indicator. Also atternatively, an amplitude responsive flaw indicating signal may be taken from the input of the synchronous detector as received from the amplifier coupled to the band pass filter. This amplitude responsive flaw indicating signal is also fed through the threshold amplifier to a suitable indicator. Because the integrator low pass—averages the signal, so flaw signals do not affect balance, the system quickly and accurately corrects for drift in the flaw detecting channels but corrects relatively slowly for this drift so that the correction signals do not give false indications of flaws.

These and various other objects and features of the invention will be more clearly understood from a reading of the detailed description in conjunction with the accompanying drawing which is a combined pictorial, schematic and block diagram illustrating general principles of the invention.

Referring now to the drawing, an alternating current source of supply indicated by an input line 10 supplies power to an oscillator 11 which provides a basically constant voltage, constant frequency output to an excitation power amplifier 12. Excitation power from the amplifier 12 is applied to an inspection head excitation means 13 so that by means of one or two coils, capacitor electrodes, a luminous lamp, or other form of radiant energy devices, beams, or fields, of energy are applied to a moving sample, or workpiece, 14 being inspected.

Energy from the workpiece 14 is sensed in two different paths by separate sensing means 15, 16. In the instance of electromagnetic or electrocapacitive type excitation, these sensing means may be on the opposite side of the workpiece 14 from the excitation means 13. In the instance of light, however, the sensing means 15, 16 may either be on the opposite side of the workpiece 14 from the excitation means 13 or they may be on the same side of the workpiece as the excitation means. In this latter instance, the sensing means measure the amount of energy reflected from the workpiece 14. Signals from the sensing means 15, 16 are fed to a pair of wound potentiometers 17, 18, respectively. The output from these potentiometers is taken from the respective variable tap and is supplied to one of a pair of variable gain amplifiers 19, 20. The outputs from the variable gain amplifiers 19, 20 are fed to a difference amplifier 21 where one of the signals is subtracted from the other because the beams or fields of energy radiated from the sensing means are in phase. In other words, the signals are phased alike with respect to the sensing means such that one signal is electrically subtracted from the other in the difference amplifier 21. The difference signal from the difference amplifier is fed through a narrow band pass filter 22 and an amplifier 23 to a synchronous detector 24. The synchronous detector 24 receives a reference or comparison signal from a reference signal deriving means 25 which, in this particular instance, is a phase shifter coupled to the output of the amplifier 12. The synchronous detector 24 compares the reference signal from the reference signal deriving means 25 with the amplified difference signal from amplifier 23 and delivers an output signal which varies in accordance with the flaws deterced in the workpiece 14, which phase comparison signal is a direct current signal and is fed to a switch 26. Advantageously, the switch 26 includes a contact marked "phase" and coupled to the output of detector 24 and a second contact marked "amplitude" and coupled to the output of amplifier 23. The movable contact of the switch 26 is coupled to a suitable threshold amplifier 27, the output of which is connected to a suitable flaw indicator, not shown. If the switch 26 is coupled to the phase contact, the signal delivered through the threshold amplifier 27 is a signal indicative of changes in phase when a flaw is detected in the workpiece 14. If, however, the switch 26 is in its amplitude contact engaging position, the signal delivered to the threshold amplifier 27 is a signal indicative of changes in amplitude in accordance with the flaws in the workpiece 14.

In order to automatically balance or null the system, the system is provided with a feedback path, preferably between the synchronous detector 24 and one of the flaw detecting channels. In this particular instance, the feedback path includes an integrator 28 coupled to the output of the synchronous detector 24 and delivers a feedback signal to a switch 29 through a path 30 to one of the flaw detecting channels. In this particular instance, the feedback path 30, shown in full lines, is coupled to a variable tap 31 of variable gain amplifier 19. Because the feedback signals are fed through integrator, or adder, stage 28, the period of these feedback signals will be relatively long in comparison to the variable signals developed as a result of a flaw detection. For example, the feedback signal may be time averaged over a selected period of the order of five seconds so that the feedback signal will not cause a sufficient or rapid enough change in the signal delivered from the difference amplifier 21 to give an indication of a flaw. The feedback signal may alternatively be fed to other portions of either of the flaw detecting channels. For example, as indicated by dotted line 33, the feedback path may be changed from variable gain amplifier 19 to the sensing means 15 and employed to control the sensitivity of this sensing means. Also alternatively, the feedback may be applied to the excitation means 13, as indicated by dotted line 35, to control the energy of one of the exciting channels or fields.

The oscillator 10 may be of any convenient form such as a Hartley, a Colpitts, or a resistance-capacitance oscillator of the type shown in Figure 6m–2 on page 6–117 of Industrial Electronics Handbook by Cockrell, a McGraw-Hill publication, first edition, 1958, Amplifier 12 may be of the type such as a phase inverter shown in 4a–12, or 4a–13 in the above-mentioned handbook, followed by a push-pull power amplifier such as the type shown in Figure 4a–17 on page 4–16 of this handbook. The excitation means may be of any one of the convenient types well known in the art such as electromagnetic, capacitive, or photocell types and each cooperating sensing means may be a magnetic coil, a capacitor electrode, or a photocell, respectively. The variable gain amplifiers 19, 20 may be of the type shown in Figure 5–15, page 98 of the Radio Amateur's Handbook, 41st edition, 1964. The difference amplifier 21 may be either of the type shown in Figure 4b–9 or as shown in Figure 4b–10 of the previously-mentioned Industrial Electronics Handbook. The narrow band pass filter 22 may be of the type disclosed on page 116 of Reference Data for Radio Engineers, second edition, Federal Telephone and Radio Corporation, J. J. Little and Ives Co., 1946. The amplifier 23 may be of the type shown in Figure 4a–6 described on pages 4–5 and 4–6 of the previously-mentioned Industrial Electronics Handbook and the phase shifter 25 circuit may be according to that shown in Figure 4d–4 on page 4–44 of this handbook. The synchronous detector 24 may be of the type shown in Figure 4b–14 on page 4–29 and the integrator 28 may be of the type shown in Figure 4f–4 on page 4–59 of the Industrial Electronics Handbook.

In the operation of the system, the feedback path is opened by opening the switch 29 and the potentiometers 17, 18 are balanced to produce a substantially null difference signal at the output of difference amplifier 21. Then, by minor adjustment of the phase shifter 25, a minimum value of phase difference responsive signal is obtained from the synchronous detector 24. The feedback path is now closed by closing the switch 29 and minor adjustments of one of the potentiometers 17, 18 are made to produce a final balance of the system and thus produce a substantial null in the absence of a flaw in the workpiece 14. After these steps have been taken, the workpiece 14 may be passed in the region of the excitation means 13 and the system will deliver either phase or amplitude signals indicative of flaws and the system will maintain itself in balance or at null through varying conditions.

While I have shown and described one illustrative embodiment of this invention, it is understood that the concepts thereof may be applied to other embodiments without departing from the spirit and scope of this invention.

What is claimed is:

1. In a flaw detecting system, the combination comprising:
   an alternating current source;
   a pair of flaw detecting channels coupled to said source and including
     excitation means having its input coupled to said source for exciting a workpiece with at least two energy components, and
       first and second sensing means, each coupled to one of the energy components;
   difference amplifier means coupled to the output of said sensing means for developing a difference signal indicative of the difference in input to said sensing means;
   a synchronous detector coupled to the output of said difference amplifier means;
   variable phase shift means coupled to said source and to said synchronous detector; and
   feedback means coupled to the output of said synchronous detector and to one of said flaw detecting channels for balancing the system in the absence of a flaw in the workpiece.

2. In a flaw detecting apparatus, the combination comprising:
   a source of electrical energy;
   a pair of flaw detecting channels coupled to said source and including
     means coupled to said source for radiating two energy components in the direction of a workpiece, and
     first and second sensing means each for sensing one of the energy components;
   difference means coupled to the output of said sensing means for developing a difference signal indicative of the difference in energy sensed by said sensing means;
   phase comparison means coupled to the output of said difference means;
   a source of phase reference signals coupled to said phase comparison means; and
   feedback means coupled between the output of said phase comparison means and one of said flaw detecting channels for re-balancing said apparatus in the absence of a flaw.

3. In a flaw detection apparatus, the combination comprising:
   a source of electrical energy;
   a pair of flaw detecting channels coupled to said source and including
     means coupled to said source for radiating two energy components in the direction of a workpiece, and
     first and second sensing means each for sensing one of the energy components;
   signal comparison means coupled to the output of said sensing means for developing a signal indicative of a comparison of the energy sensed by said sensing means;
   phase comparison means coupled to the output of said signal comparison means;
   a source of phase reference signals coupled to said phase comparison means; and
   feedback means coupled between the output of said phase comparison means and one of said flaw detecting channels for re-balancing said apparatus in the absence of a flaw.

4. In a flaw detection apparatus, the combination comprising:
   a source of electrical energy;
   a pair of flaw detecting channels coupled to said source and including
     means coupled to said source for radiating two energy components in the direction of a workpiece, and
     sensing means for sensing the energy components and delivering an output signal for each energy component;
   signal comparison means coupled to the output of said sensing means for developing a signal indicative of a comparison of the energy components sensed by said sensing means;
   phase comparison means coupled to the output of said signal comparison means;
   a source of phase reference signals coupled to said phase comparison means; and
   feedback means coupled between the output of said phase comparison means and one of said flaw detecting channels for re-balancing said apparatus in the absence of a flaw.

5. In a flaw detection apparatus, the combination comprising:
   a source of electrical energy;
   a pair of flaw detecting channels coupled to said source and including
     means coupled to said source for radiating two energy components in the direction of a workpiece, and
     sensing means for sensing the energy components and delivering an output signal for each energy component;
   signal comparison means coupled to the output of said sensing means for developing a signal indicative of a comparison of the energy components sensed by said sensing means;
   phase comparison means coupled to the output of said signal comparison means;
   a source of phase reference signals coupled to said phase comparison means; and
   feedback means coupled between the output of said phase comparison means and said sensing means for re-balancing said apparatus in the absence of a flaw.

6. In a flaw detection apparatus, the combination comprising:
   a source of electrical energy;
   a pair of flaw detecting channels coupled to said source and including
     means coupled to said source for directing two energy components in the direction of a workpiece, and
     sensing means for sensing the energy components and delivering an output signal for each energy component;
   signal comparison means coupled to the output of said sensing means for developing a signal indicative of a comparison of the energy components sensed by said sensing means;

phase comparison means coupled to the output of said signal comparison means;

a source of phase reference signals coupled to said phase comparison means; and feedback means coupled between the output of said phase comparison means and said energy directing means for maintaining said apparatus in balance in the absence of a flaw.

7. In a flaw detection apparatus, the combination comprising:

a source of electrical energy;

a pair of flaw detecting channels coupled to said source and including means coupled to said source for directing two energy components in the direction of a workpiece, sensing means for sensing the energy components and delivering an output signal for each energy component, and amplifier means for amplifying each of said output signals;

means coupled to the output of said amplifying means for developing a signal indicative of a comparison of the energy components sensed by said sensing means;

phase comparison means coupled to the output of said signal comparison means;

a source of phase reference signals coupled between said source and said phase comparison means; and feedback means including an integrator means coupled between the output of said phase comparison means and one of said channels for maintaining said apparatus in balance in the absence of a flaw.

8. In a flaw detection apparatus, the combination comprising:

a source of electrical energy;

a pair of flaw detecting channels coupled to said source and including means coupled to said source for directing two energy components in the direction of a workpiece, sensing means for sensing the energy components and delivering an output signal for each energy component, and amplifier means for amplifying each of said outpot signals;

signal comparison means coupled to the output of said amplifier means for delivering a signal indicative of a comparison of the energy components sensed by said sensing means;

phase comparison means coupled to the output of said signal comparison means;

a source of phase reference signals coupled between said source and said phase comparison means;

feedback means including an integrator means coupled between the output of said phase comparison means and said amplifier means for maintaining said apparatus in balance in the absence of a flaw; and flaw indicating means coupled to said signal comparison means.

9. In a flaw detection apparatus, the combination comprising:

a source of electrical energy;

a pair of flaw detecting channels coupled to said source and each including means coupled to said source for directing an energy component in the direction of a workpiece, sensing means for sensing the energy of one of said components and for delivering an output signal indicative of said one component, and amplifier means for amplifying said output signal;

signal comparison means coupled to the output of each of said flaw detecting channels for developing a signal indicative of a comparison of the energy components sensed by said sensing means;

phase comparison means coupled to the output of said signal comparison means;

a source of phase reference signals coupled between said source and said phase comparison means;

feedback means including an integrator means coupled between the output of said phase comparison means and said amplifier means for maintaining said apparatus in balance in the absence of a flaw; and flaw indicating means coupled to the output of said phase comparison means.

10. In a flaw indicating apparatus, the combination comprising:

a source of electrical energy;

a pair of flaw detecting channels coupled to said source and including means coupled to said source for directing two energy components in the direction of a workpiece, sensing means for sensing the energy components and delivering an output signal for each energy component, and amplifier means for amplifying each of said output signals;

signal comparison means coupled to the output of said amplifier means for developing a signal indicative of the difference in signals from said amplifier means;

phase comparison means coupled to the output of said signal comparison means;

a source of phase reference signals coupled between said source and said phase comparison means;

feedback means including an integrator means coupled between the output of said phase comparison means and said amplifier means for maintaining said apparatus in balance in the absence of a flaw;

switching means for selectively coupling alternatively to said signal comparison means and to said phase comparison means; and flaw indicating means coupled to said switching means.

References Cited

UNITED STATES PATENTS 3,210,546 10/1965 Perron _____ 250—219
3,218,863 11/1965 Calvert _____ 324—61

RALPH G. NILSON, *Primary Examiner.*

J. D. WALL, *Assistant Examiner.*